United States Patent
Kikuchi

[11] Patent Number: 5,892,748
[45] Date of Patent: Apr. 6, 1999

[54] OPTICAL PICKUP FOR READING OR RECORDING INFORMATION ON A RECORDING SURFACE

[75] Inventor: Ikuya Kikuchi, Tsurugashima, Japan

[73] Assignee: Pioneer Electronic Corporation, Tokyo, Japan

[21] Appl. No.: 611,753

[22] Filed: Mar. 6, 1996

[30]   Foreign Application Priority Data

Mar. 10, 1995   [JP]   Japan ................................. 7-051571

[51] Int. Cl.$^6$ ....................................................... G11B 7/00
[52] U.S. Cl. ................................................ 369/112; 369/109
[58] Field of Search ................................. 369/93, 94, 109, 369/110, 112, 58, 103

[56]         References Cited

U.S. PATENT DOCUMENTS 5,526,338   6/1996   Hasman et al. ..................... 369/94 X

FOREIGN PATENT DOCUMENTS 0610055   8/1994   European Pat. Off. .

*Primary Examiner*—Paul W. Huber
*Attorney, Agent, or Firm*—Morgan, Lewis & Bockius LLP

[57]          ABSTRACT

An optical pickup reads or records information on a recording surface of a first optical record medium or a second optical record medium, each of which has a protection film different in thickness from each other. The optical pickup includes: a light beam source for emitting a light beam; a dividing unit for dividing the light beam into a non-diffracted light, which is a portion of the light beam other than diffracted lights, and a first order diffracted light; and a converging unit for converging the non-diffracted light and the first order diffracted light. Further, an optical path length between the light beam source and the converging unit is determined so that the non-diffracted light is converged onto the recording surface of the first optical record medium and a spherical aberration of the non-diffracted light converged onto the recording surface of the first optical record medium is minimized. And the dividing unit is constructed so that the first order diffracted light is converged onto the recording surface of the second optical record medium and a spherical aberration of the first order diffracted light converged onto the recording surface of the second optical record medium is minimized.

6 Claims, 3 Drawing Sheets

OPTICAL PICKUP FOR READING OR RECORDING INFORMATION ON A RECORDING SURFACE

BACKGROUND OF THE INVENTION

1. Field of the Invention

The present invention relates to an optical pickup for reading or recording information on a recording surface of a first optical record medium such as a compact disk or a second optical record medium such as a digital video disk, each of which has a protection film different in thickness from each other.

2. Description of the Related Art

There is known an optical system for recording and reproducing digital information including video data on an optical record medium. The optical system records and reproduces the digital information recorded onto the optical record disk in the higher density compared with conventional compact disk.

In order to reproduce the optical record disk, in which the digital video information is recorded in the high density, an optical pickup system, the resolution of which is so high as to reproduce the information recorded in the high density, is used.

There are two methods of increasing the resolution as follows:

(1) According to first method of increasing the resolution, the wave length of a light beam emitted by a light beam source is decreased. A semi-conductor laser, in which the wave length of a light beam is so short as to achieve the high resolution, has already been used.

(2) According to second method of increasing the resolution, the numerical aperture of an objective lens is increased. In case of increasing the resolution by increasing the numerical aperture, a detection signal obtained from the pickup system is influenced by the effect of aberration.

Particularly, if the recording surface of the optical record disk is not vertical to the optical axis of the objective lens due to the curve or the tilt of the optical record disk, the detection signal is considerably influenced by the effect of the aberration and it is difficult to increase the numerical number.

In order to overcome this difficulty, new disk standard is proposed. According to the new disk standard, an optical disk, which includes a protection film having thickness (0.6 mm as an example) less than that (1.2 mm) of the conventional optical disk, is proposed. Namely, since the effect of aberration due to the curve or the tilt of the optical record disk is decreased when the thickness of the optical disk is decreased, the effect of the aberration is decreased when the thickness of the optical disk is half of that of the conventional optical disk.

Therefore, when the thickness of the optical disk is half of that of the conventional optical disk, a small light spot is converged on the recording surface of the optical record disk by using an objective lens having an numerical number greater than that of the conventional disk and then information recorded on the recording surface of the optical disk in the high density can be reproduced by using the small light spot.

However, if a compatible player, which can reproduce the conventional optical disk and the optical disk based on the new optical disk standard, is constructed, the optical pickup of the compatible player should read information recorded on the conventional optical disk and the optical disk based on new optical disk standard.

However, if the objective lens of the optical pickup provided in the compatible player is arranged so that a light spot of a light beam converged by the objective lens on the optical disk having a protection film thickness less than that of the conventional optical disk is minimized, the light spot of the light beam converged on the conventional optical disk becomes broader and it is impossible to reproduce the information recorded in the conventional optical disk by using the light spot.

In order to overcome the problems, there is an optical pickup, which uses a bifocal lens, which consists of a hologram.

According to the optical pickup, which uses a bifocal lens, a laser beam emitted from the laser diode is reflected by a half-mirror and converted into a parallel light beam by a collimator lens. The parallel light beam is divided by an optical device, which consists of a hologram, into a non-diffracted light, which is a portion of the light beam other than diffracted lights and a first order diffracted light. The non-diffracted light is converged onto a recording surface of the conventional optical disk and the first order diffracted light is converged onto a recording surface of the optical disk based on the new optical disk standard by an objective lens, which is integrally formed with the optical device.

However, this optical pickup, which uses a bifocal lens, is disadvantageous in that it is complex in structure and is constructed on a large scale, since an objective lens is integrally formed with the heavy optical device and the strong driving force of an actuator for performing the focus control and the tracking control is needed.

SUMMARY OF THE INVENTION

Accordingly, an object of the present invention is to substantially eliminate defects and drawings encountered in the prior art and to provide an optical pickup, which is simpler in structure and downsized, for reading or recording information on a recording surface of each of a plurality of optical record mediums, each of which has a protection film different in thickness each other.

According to one aspect of the present invention, there is provided an optical pickup for reading or recording information on a recording surface of a first optical record medium or a second optical record medium, each of which has a protection film different in thickness from each other including: a light beam source for emitting a light beam; a dividing unit for dividing the light beam into a non-diffracted light, which is a portion of the light beam other than diffracted lights, and a first order diffracted light; and a converging unit for converging the non-diffracted light and the first order diffracted light, whereby an optical path length between the light beam source and the converging unit is determined so that the non-diffracted light is converged onto the recording surface of the first optical record medium and a spherical aberration of the non-diffracted light converged onto the recording surface of the first optical record medium is minimized; and the dividing unit is constructed so that the first order diffracted light is converged onto the recording surface of the second optical record medium and a spherical aberration of the first order diffracted light converged onto the recording surface of the second optical record medium is minimized.

According to the construction of the present invention, a light beam emitted from the light beam source is divided by a dividing unit into a non-diffracted light, which is a portion of the light beam other than diffracted lights, and a first order diffracted light. By a converging unit, the non-diffracted light is converged on a recording surface of a first optical record medium and the first order diffracted light is converged on a recording surface of a second optical record medium. Further, an optical path length between the light beam source and the converging unit is determined so that the non-diffracted light is converged onto the recording surface of the first optical record medium and a spherical aberration of the non-diffracted light converged onto the recording surface of the first optical record medium is minimized and the dividing unit is constructed so that the first order diffracted light is converged onto the recording surface of the second optical record medium and a spherical aberration of the first order diffracted light converged onto the recording surface of the second optical record medium is minimized.

In accordance with the present invention, the dividing unit may include a collimator lens, which consists of a hologram, and an optical path length between the light beam source and the dividing unit may be determined so that the first order diffracted light is parallel to an optical axis of the converging unit.

According to another aspect of the present invention, there is provided an optical pickup for reading or recording information on a recording surface of each of more than two optical record mediums, each of which has a protection film different in thickness each other including: a light beam source for emitting a light beam; a dividing unit for dividing the light beam into a non-diffracted light, which is a portion of the light beam other than diffracted lights, and a plurality of diffracted lights; and a converging unit for converging the non-diffracted light and the plurality of diffracted lights, whereby an optical path length between the light beam source and the converging unit is determined so that the non-diffracted light is converged onto the recording surface of one of the more than two optical record mediums and a spherical aberration of the non-diffracted light converged onto the recording surface is minimized; and the dividing unit is constructed so that each of the plurality of the diffracted lights is converged onto the recording surface of the more than two optical record mediums other than the one of the more than two optical record mediums and a spherical aberration of each of the plurality of the diffracted lights converged onto the recording surface is minimized.

According to the construction of the present invention, a light beam emitted from a light beam source is divided by a dividing unit into a non-diffracted light, which is a portion of the light beam other than diffracted lights, and a plurality of diffracted lights. The non-diffracted light and the plurality of diffracted lights are converged by a converging unit. Further, an optical path length between the light beam source and the converging unit is determined so that the non-diffracted light is converged onto the recording surface of one of the more than two optical record mediums and a spherical aberration of the non-diffracted light converged onto the recording surface is minimized; and the dividing unit is constructed so that each of the plurality of the diffracted lights is converged onto the recording surface of the more than two optical record mediums other than the one of the more than two optical record mediums and a spherical aberration of each of the plurality of the diffracted lights converged onto the recording surface is minimized.

According to the present invention, the dividing unit may include a plurality of collimator lenses, each of which consists of a hologram. An optical path length between the light beam source and the dividing unit may be determined so that one of said plurality of diffracted lights, which is divided by the dividing unit, is parallel to an optical axis of the converging unit. Further, the dividing unit may divide the light beam into (2n+1)th order diffracted lights (n is an integral number greater than or equal to zero), which are used as the plurality of diffracted lights.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

A preferred embodiment according to the present invention will now be described below with reference to the accompanying drawings.

First Embodiment

Figure 1:
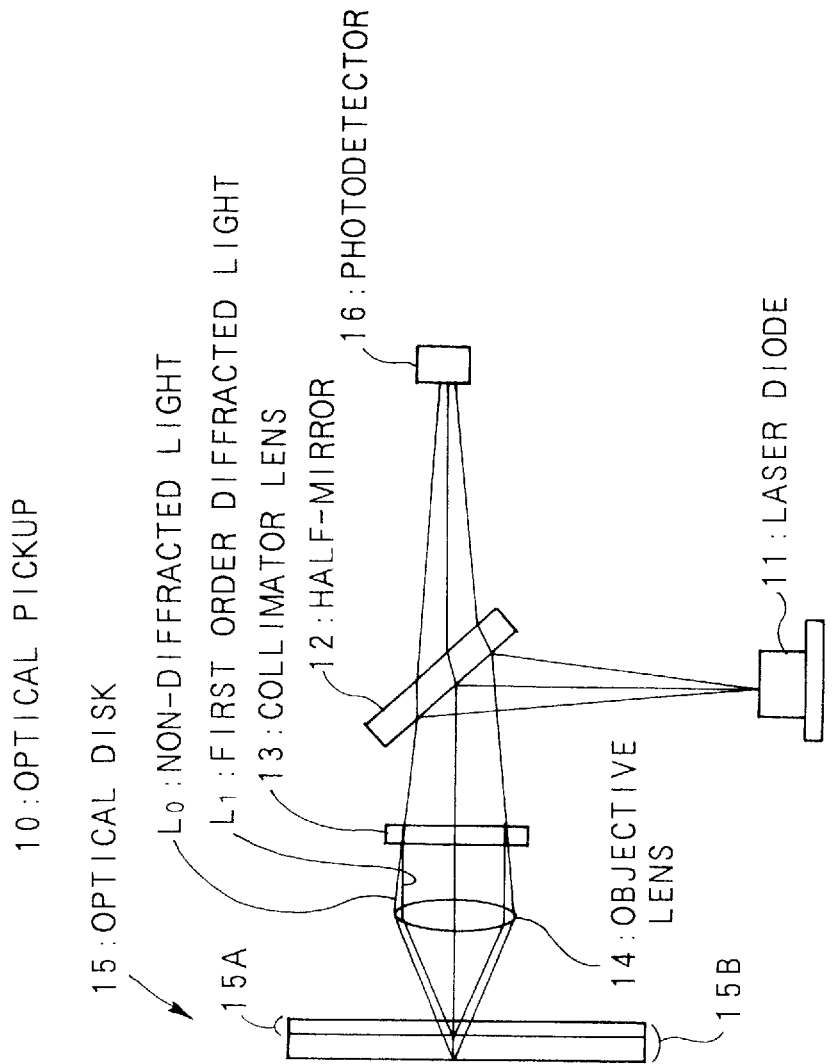
FIG. 1 is a diagram showing a basic structure of an optical pickup according to the first embodiment of the present invention.

FIG. 1 is a diagram showing a basic structure of an optical pickup according to the first embodiment of the present invention.

As shown in FIG. 1, the optical pickup is provided with: a laser diode 11 as a light source; a half-mirror 12 for reflecting a laser beam emitted from the laser diode 11 toward an optical disk 15 (disk 15A or 15B) and for transmitting the laser beam reflected by the optical disk 15; a collimator lens 13, which consists of a hologram, for dividing the laser beam reflected by the half-mirror 12 into a non-diffracted light $L_0$, which is a portion of the light beam other than diffracted lights and a first order diffracted light $L_1$; an objective lens 14. for receiving the light $L_0$ and the light $L_1$, which is parallel to an optical axis of the objective lens 14, and converging the light $L_0$ onto a recording surface of the optical disk 15B and the first order diffracted light $L_1$ onto a recording surface of the optical disk 15A; and a photodetector 16 for receiving the reflected lights from the disk 15 through the objective lens 14, the collimator lens 13 and the half-mirror 12 and converting it to a detection signal.

Operation of the optical pickup according to the first embodiment of the present invention will be described below.

A laser beam, which consists of diffused lights emitted from the laser diode 11, is reflected toward a collimator lens 13 by a half-mirror 12. The collimator lens 13 divides the laser beam emitted from the laser diode 11 into a non-diffracted light $L_0$, which is a portion of the light beam other than diffracted lights and a first order diffracted light $L_1$. An objective lens 14 receives the light $L_0$ and converges the light $L_0$ onto a recording surface of the optical disk 15B. For example, the optical disk 15B, which comprises a protection film having thickness greater than that of a protection film of the optical disk 15A, corresponds to a Compact Disk having thickness of 1.2 mm.

An optical path length from the objective lens 14 to the laser diode 11 is determined so that the spherical aberration of the light $L_0$ converged onto the recording surface of the optical disk 15B is minimized.

Further, the collimator lens 13 is designed so that the first order diffracted light $L_1$ received by the objective lens 14 is parallel to an optical axis of the objective lens 14. The objective lens 14 receives the first order diffracted light $L_1$, which is parallel to an optical axis of the objective lens 14, and the first order diffracted light $L_1$ is converged onto a recording surface of the optical disk 15A so that the spherical aberration of the light $L_1$ converged onto the recording surface of the optical disk 15A is minimized. For example, the optical disk 15A, which comprises a protection film having thickness less than that of a protection film of the optical disk 15B, corresponds to a Digital Video Disk having thickness of 0.6 mm. In this embodiment, a numerical aperture of the objective lens 14 is approximately 0.6.

The lights reflected by the disk 15 is transmitted through the objective lens 14, the collimator lens 13 and the half-mirror 12 and received by a photodetector 16, which converts the reflected lights to a detection signal.

Therefore, in case of reproducing or recording into the optical disk 15A, which comprises a protection film having thickness less than that of a protection film of the optical disk 15B, the first order diffracted light $L_1$ is used and the first order diffracted light $L_1$ is converged onto a recording surface of the optical disk 15A. In case of reproducing or recording into the optical disk 15B, the light $L_0$ is used and the light $L_0$ is converged onto a recording surface of the optical disk 15B.

Here, an optical path length between the laser diode 11 and the collimator lens 13 is determined so that the first order diffracted light $L_1$ is parallel to the optical axis of the objective lens 14. Since the first order diffracted light $L_1$ is parallel to the optical axis of the objective lens 14, the spherical aberration at the recording surface of the optical disk 15A is not increased if the position of the optical disk 15 is moved toward the direction of the optical axis of the objective lens 14. Therefore, since a small light spot of the first order diffracted light $L_1$ is shaped on the recording surface of the optical disk 15A by the objective lens 14, an optical disk, in which data is recorded in high density, can be easily reproduced.

According to the first embodiment, the focus control and the tracking control is performed by only driving an objective lens without driving a collimator lens, which consists of a hologram being heavy. Therefore, since the driving force of an actuator for performing the focus control and the tracking control is decreased, the actuator is downsized and then the optical pickup is also downsized.

The above mentioned first embodiment suppose that there are no difference in recording density or the size of pits for recording data between the optical disks 15A and 15B. The only difference between the optical disks 15A and 15B is the thickness of the protection film.

Second Embodiment

The above mentioned first embodiment relates to the optical pickup, which can record into or reproduce the optical disks 15A and 15B, each of which comprises a protection film different in thickness from each other. According to the second embodiment of the present invention, more than two optical disks, each of which comprises a protection film different in thickness from each other, can be reproduced by using the first order diffracted light $L_1$ and $(2n+1)$th order diffracted lights (n is an integral number greater than or equal to zero).

In this case, the $(2n+1)$th order diffracted lights are used, since the quantity of the diffracted light is easily controlled by using the $(2n+1)$th diffracted lights.

Third Embodiment

With respect to the above mentioned first and second embodiments, the pickup system is constructed by using one collimator lens which consists of a hologram. If the pickup system is constructed by using a plurality of collimator lenses, each of which consists of a hologram, for dividing laser beam into a non-diffracted light which is a portion of the light beam other than diffracted lights and one or more than one diffracted lights, one of which is parallel to an optical axis of the collimator lenses, a plurality of diffracted lights are reproduced by the plurality of collimator lenses. Therefore, a plurality of optical disks, each of which has a protection film different in thickness from each other, can be reproduced by using the plurality of diffracted lights.

Figure 2:
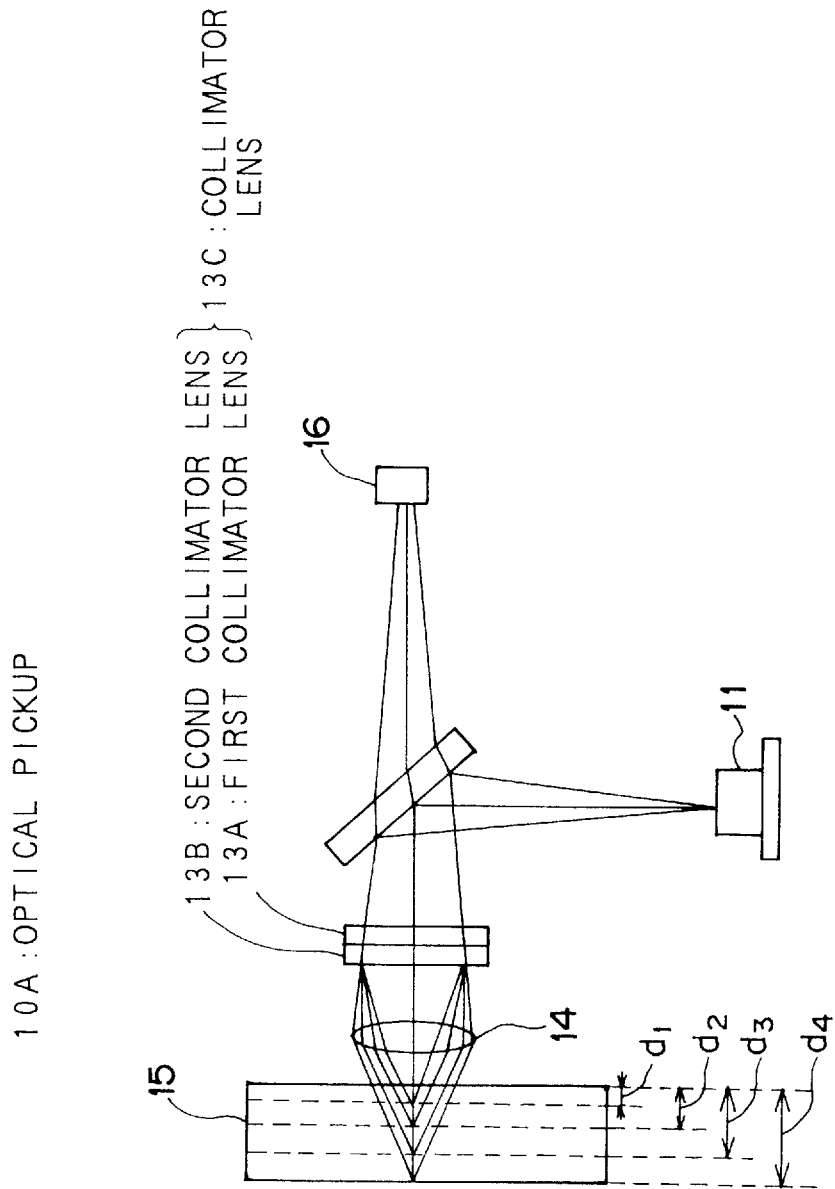
FIG. 2 is a diagram showing a basic structure of an optical pickup according to the third embodiment of the present invention.
Figure 3:
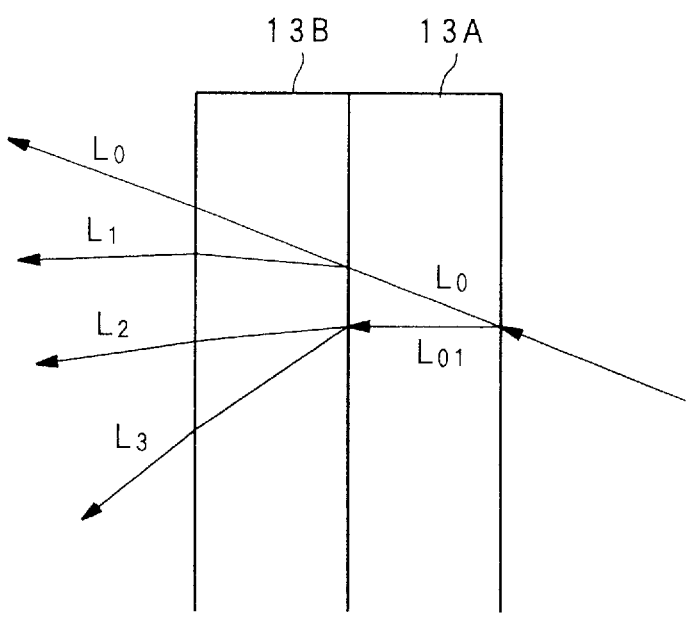
FIG. 3 is a diagram showing a basic structure of a collimator lens 13C, which consists of a first collimator lens 13A and a second collimator lens 13B.

FIG. 2 is a diagram showing a basic structure of an optical pickup according to the third embodiment of the present invention. FIG. 3 is a diagram showing a basic structure of a collimator lens 13C, which consists of a first collimator lens 13A and a second collimator lens 13B.

As shown in FIG. 2 and FIG. 3, the optical pickup is provided with: a laser diode 11 as a light source; a half-mirror 12 for reflecting a laser beam emitted from the laser diode 11 toward an optical disk 15 and for transmitting the laser beam reflected by the optical disk 15; a first collimator lens 13A, which consists of a hologram, for dividing the laser beam reflected by the half-mirror 12 into a non-diffracted light $L_0$, which is a portion of the light beam other than diffracted lights and a first order diffracted light $L_{01}$; a second collimator lens 13B, which consists of a hologram, for dividing the non-diffracted light $L_0$ into the non-diffracted light $L_0$ and a first order diffracted light $L_1$, which is parallel to an optical axis of the collimator lens 13B, and the first order diffracted light $L_{01}$, into a second order diffracted light $L_2$ and a third order diffracted light $L_3$; an objective lens 14 for converging the light $L_0$ onto a recording surface of an optical disk 15D, the first order diffracted light $L_1$, onto a recording surface of an optical disk 15C, the second order diffracted light $L_2$ onto a recording surface of an optical disk 15B, and the third order diffracted light $L_3$ onto a recording surface of an optical disk 15A; and a photodetector 16 for receiving the reflected lights from the disk 15 through the objective lens 14, the collimator lens 13 and the half-mirror 12 and converting it to a detection signal.

Operation of the optical pickup according to the third embodiment of the present invention will be described below.

A laser beam emitted from the laser diode 11 is reflected toward a collimator lens 13A by a half-mirror 12. The collimator lens 13A divides the laser beam emitted from the laser diode 11 into a light $L_0$, which is a portion of the light beam other than diffracted lights and a first order diffracted light $L_{01}$. The collimator lens 13B divides the light $L_0$ into the light $L_0$ and a first order diffracted light $L_0$ and the first order diffracted light $L_{01}$ into the second order diffracted light $L_2$ and the third order diffracted light $L_3$. An objective lens 14 receives the light $L_0$ and converges it onto a recording surface of an optical disk 15D; receives the light $L_1$, which is parallel to an optical axis of the objective lens 14, and converges it onto a recording surface of an optical disk 15C; receives the light $L_2$ and converges it onto a recording surface of an optical disk 15B; and receives the light $L_3$ and converges it onto a recording surface of an optical disk 15A.

An optical path length from the objective lens 14 to the laser diode 11 is determined so that the spot of the light $L_0$ converged onto a recording surface of the optical disk 15D is minimized. An optical path length between the laser diode 11 and the collimator lens 13A is determined so that one of said plurality of diffracted lights is parallel to the optical axis of the objective lens 14.

The lights reflected by the disk 15 are transmitted through the objective lens 14, the collimator lenses 13A, 13B and the half-mirror 12 and received by a photodetector 16, which converts the reflected lights to a detection signal.

Therefore, in case of reproducing or recording into the optical disk 15A, which comprises a protection film having thickness d1, the third order diffracted light $L_3$ is used. In case of reproducing or recording into the optical disk 15B, which comprises a protection film having thickness d2, the second order diffracted light $L_2$ is used. In case of reproducing or recording into the optical disk 15C, which comprises a protection film having thickness d3, the first order diffracted light $L_1$ is used. In case of reproducing or recording into the optical disk 15D, the light $L_0$ is used.

Although a focus control and a tracking control are not explained in the above description, a conventional focus control system and a conventional tracking system are used to construct the above optical pickup of the present invention.

According to the present invention, the focus control and the tracking control is performed by only driving an objective lens without driving a collimator lens, which consists of a hologram being heavy. Therefore, since the driving force of an actuator for performing the focus control and the tracking control is decreased, the actuator is downsized and then the optical pickup is also downsized.

According to one aspect of the present invention, the non-diffracted light is converged onto the recording surface of the first optical record medium and a spherical aberration of the non-diffracted light converged onto the recording surface of the first optical record medium is minimized and the first order diffracted light is converged onto the recording surface of the second optical record medium and a spherical aberration of the first order diffracted light converged onto the recording surface of the second optical record medium is minimized. Therefore, since the smallest light spot of the non-diffracted light is converged onto the recording surface of the first optical record medium and the smallest light spot of the first order diffracted light is converged onto the recording surface of the second optical record medium, the first and second record mediums, each of which has a protection film different in thickness from each other, in which data is recorded in high density, can be easily reproduced.

According to another aspect of the present invention, the non-diffracted light is converged onto the recording surface of one of more than two optical record mediums and a spherical aberration of the non-diffracted light converged onto the recording surface is minimized and each of a plurality of the diffracted lights is converged onto the recording surface of said more than two optical record mediums other than said one of the more than two optical record mediums and a spherical aberration of each of said plurality of the diffracted lights converged onto the recording surface is minimized. Therefore, since the smallest light spot of the non-diffracted light is converged onto the recording surface of the one of more than two optical record mediums and the smallest light spot of each of said plurality of the diffracted lights converged onto the recording surface of another optical record medium of said more than two optical record mediums other than said one of the more than two optical record mediums, more than two optical record mediums, each of which has a protection film different in thickness each other, in which data is recorded in high density, can be easily reproduced.

In the above description, although the optical pickup, which records into or reproduces the optical disk, is explained as an example, the present invention is applied to an optical card, which can be recorded into or reproduced by the optical pickup of the present invention.

The present invention may be embodied in other preferred forms by using the conventional optical system without departing from the spirit or essential characteristics thereof. In the other embodiments, if the collimator lens, which consists of a hologram, is used to divide a laser beam into a non-diffracted light, which is a portion of the light beam other than diffracted lights, and a diffracted light and is designed so that the non-diffracted light is converged onto a recording surface of an optical disk and the diffracted light is converged onto a recording surface of another optical disk, the thickness of which is different from that of the optical disk, an optical pickup, which can reproduce two optical disks, each of which has a protection film different in thickness from each other, can be constructed. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup for reading or recording information on a recording surface of a first optical recording medium or a second optical recording median, each of which has a protection film different in thickness from each other comprising:

a light beam source for emitting a light beam;

converging means for converging a non-diffracted light component and a first order diffracted light component that is parallel to an optical axis of the converging means; and dividing means for dividing the light beam into the non-diffracted light component, which is a portion of a light beam component other than diffracted light components, and the parallel first order diffracted light component, whereby an optical path length between the light beam source and the converging means is determined so that the non-diffracted light component is converged onto the recording surface of the first optical recording medium; and the dividing means is constructed so that the parallel first order diffracted light component is converged onto the recording surface of the second optical recording medium and a spherical aberration of the non-diffracted light component converged onto the recording surface of the fist optical recording medium and a spherical aberration of the first order diffracted light component converged onto the recording surface of the second optical recording medium is minimized.

2. An optical pickup according to claim 1, wherein said dividing means comprises a collimator lens, which includes a hologram.

3. An optical pickup according to claim 2, wherein an optical path length between the light beam source and the dividing means is determined so that the first order diffracted light component is parallel to an optical axis of the converging means.

4. An optical pickup according to claim 1, wherein said dividing means comprises a plurality of collimator lenses, each of which includes a hologram.

5. An optical pickup according to claim 1, wherein the dividing means divides the light beam into (2n+1)th order diffracted light components (n is an integral number greater than or equal to zero).

6. An optical pickup according to claim 5, wherein an optical path length between the light beam source and the dividing means is determined so that one of the diffracted light components, which is divided by the dividing means, is parallel to an optical axis of the converging means.

* * * * *